(12) United States Patent
Inaba et al.

(10) Patent No.: US 7,567,277 B2
(45) Date of Patent: Jul. 28, 2009

(54) IMAGE-PICKUP DEVICE AND SIGNAL PROCESSING METHOD FOR NOISE CORRECTION

(75) Inventors: Seijiro Inaba, Kanagawa (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 728 days.

(21) Appl. No.: 11/172,817

(22) Filed: Jul. 5, 2005

(65) Prior Publication Data
US 2006/0007507 A1 Jan. 12, 2006

(30) Foreign Application Priority Data
Jul. 7, 2004 (JP) ............................ P2004-201015

(51) Int. Cl.
*H04N 9/64* (2006.01)
*H04N 5/217* (2006.01)
(52) U.S. Cl. ...................................... 348/245; 348/257
(58) Field of Classification Search ......... 348/241–257, 348/308, 222.1
See application file for complete search history.

(56) References Cited

U.S. PATENT DOCUMENTS

| 6,101,287 | A | * | 8/2000 | Corum et al. ................ 382/274 |
| 6,525,769 | B1 | | 2/2003 | Thomas et al. |
| 7,098,950 | B2 | * | 8/2006 | Yamamoto et al. .......... 348/243 |
| 2004/0090547 | A1 | * | 5/2004 | Takeda ........................ 348/241 |

FOREIGN PATENT DOCUMENTS

JP 10-126697 5/1998

* cited by examiner

*Primary Examiner*—Lin Ye
*Assistant Examiner*—Nelson D. Hernández
(74) *Attorney, Agent, or Firm*—Finnegan, Henderson, Farabow, Garrett & Dunner, L.L.P.

(57) ABSTRACT

The present invention provides an image pickup device that can accurately adjust the black level value of the effective pixel area while correcting column noise contained in pixel signals of the effective pixel area. The image pickup device includes a solid-state image pickup element having a pixel part including an effective pixel area to be irradiated with light, a vertical light-shielded pixel area and a horizontal light-shielded pixel area where irradiation of light is shielded, a vertical scanning circuit, a horizontal scanning circuit, and an output circuit, a light-shielding section which shuts off light irradiated on the effective pixel area, a black level value detector which detects black level values of the vertical light-shielded pixel area, the horizontal light-shielded pixel area, and the effective pixel area shielded from light by the light-shielding section, based on pixel signals outputted from the output circuit of the solid state image pickup element, a comparator which compares the black level values, a noise component detector which detects a noise component, a noise corrector which corrects noise generated in the effective pixel area, based on the noise component detected by the noise component detector, and a controller which controls the noise component detector and the noise corrector, based on a comparison result of the comparator.

12 Claims, 11 Drawing Sheets

IMAGE-PICKUP DEVICE AND SIGNAL PROCESSING METHOD FOR NOISE CORRECTION

CROSS REFERENCES TO RELATED APPLICATIONS

The present invention contains subject matter related to Japanese Patent Application JP 2004-201015 filed in the Japanese Patent Office on Jul. 7, 2004, the entire contents of which being incorporated herein by reference herein.

BACKGROUND OF THE INVENTION

1. Field of the Invention

The present invention relates to an image pickup device which picks up an image of an object by use of an XY address type solid-state image pickup element, and a signal processing method for the image-pickup device.

2. Description of the Related Art

In a solid-state image pickup element of an XY address type represented by a CMOS (complementary metal oxide semiconductor) sensor, a large number of pixels are arrayed in a matrix of lines and columns, as shown in FIG. 1. The element has a vertical scanning circuit 54 to select sequentially lines of a pixel part 52, a horizontal scanning circuit 60 to select sequentially columns of the pixel part 52, and an output circuit 61 to output signals.

The vertical scanning circuit 54 and the horizontal scanning circuit 60 are constituted by, for example, shift-registers, and generate one vertical scanning pulse and one horizontal scanning pulse for every line and column, respectively.

When reading image signals charged in respective pixels, a pulse signal is added to one vertical selection line 53 by the vertical scanning circuit 54, to electrically conduct all pixel transistors 51 in one line. Image signals are read from respective photosensitive parts 50 onto vertical signal lines 55. The image signals read onto the vertical signal lines 55 are fed to circuits such as a correlative double sampling circuit (CDS) 56 and the like to remove an offset signal for every pixel.

The horizontal scanning circuit 60 adds a pulse signal to transistors 57 connected to the respective vertical signal lines 55 through horizontal selection lines 59, to electrically conduct the transistors 57. Pixel signals from a column from which offset signals has been removed by the CDS 56 are read onto a horizontal signal line 58. The pixel signals are converted into voltage signals by the output circuit 61, and are outputted to the outside.

In an XY address type solid-state image pickup element of this kind, the columns respectively have different (or their own) vertical signal lines 55. Hence, pixel signals fed from the output circuit 61 are offset differently between individual columns if the CDSs 56 and the transistors 57 have characteristic variants. Various offsets which are respectively specific to the columns appear, as stripe-like fixed-pattern noise (hereinafter called column noise) on a display screen, and cause deterioration in image quality.

There has been a method for preventing this deterioration. In the method, only the column noise component is extracted from the solid-state image pickup element, and is maintained as a reference signal for correction. During a normal image pickup operation, the reference signal is subtracted from a signal output from the solid-state image pickup element, to correct column noise.

However, when the pixel part 52 is irradiated with light, a signal component based on the incident light is added to the column noise component. Therefore, this output signal cannot be used as a reference signal for correction. Hence, according to Japanese Patent Application Laid-Open Publication No. 10-126697, the pixel part 52 is constituted by an effective pixel area A, a vertical optical black (hereinafter abbreviated as VOPB) area B, and a horizontal optical black (HOPB) area C, as shown in FIG. 2, and performs detection/correction of the column noise. The effective pixel area A is irradiated with light. In the vertical optical black area B and the horizontal optical black area C, irradiation of light is shielded over several lines to several ten lines by a light-shield plate such as an aluminum thin film or the like.

Meanwhile, the offset of each column which causes column noise appears in outputs not only from pixels positioned in the effective pixel area A but also from pixels positioned in the VOPB area B as a shielded black level reference. Therefore, correction can be achieved in a manner that column noise components are detected by use of signals from the pixels in the VOPG area B and are subtracted from signals from the pixels from the effective pixel area A.

SUMMARY OF THE INVENTION

However, in case of obtaining a reference signal for correcting column noise by use of signals output from the pixels arrayed in the VOPB area B, there is a significant problem of influence from a dark current component (hereinafter called random noise) which is outputted from each pixel in the VOPB area B and varies. In particular, the VOPB area B covers several lines to several ten lines and so includes a small number of pixels. Therefore, even when an averaging processing is carried out, random noise contained in signals outputted from respective pixels cannot be suppressed sufficiently.

There hence has been a method based on an assumption that the black level of pixel signals outputted from the pixels arranged in the HOPB area C and that of pixel signals outputted from the pixels arranged in the effective pixel area A are equal to each other. On this assumption, the black level of the HOPB area C is detected constantly, and the black level of the HOPB area C is subtracted from pixel signals from the effective pixel area A. The black level of the effective pixel area A is matched with the black level of the HOPB area C, thereby to adjust the black level of the effective pixel area A to zero.

However, in the solid-state image pickup element of the XY address type, column noise is generated due to some structural reasons. Therefore, if the number of columns in the HOPB area C is not sufficient for suppressing the influence of column noise, the black level detected in the HOPB area C is displaced from that of the effective pixel area A, as shown in FIG. 3. The assumption described above is not satisfied any more. Even if the black level of the HOPB area C is subtracted from signals from the effective pixel area A, the black level of the effective pixel area A cannot be properly adjusted to zero.

FIG. 3B shows the difference value $\Delta BL$ between the black level values of the HOPB area C and the effective pixel area A, with respect to a segment $\overline{DE}$ in FIG. 3A.

In addition, there is a case that the black level of the VOPB area B is displaced from that of the effective pixel area A due to some structural reasons of the solid-state image pickup element even if the black level of the HOPB area C and that of the effective pixel area A should be equal to each other. In this case, when column noise is corrected, a column noise component detected in the VOPB area B is used directly for column noise correction, and therefore, the black level of the effective pixel area A is displaced. This displacement of the black level causes darkening or lightening of black color in images, and leads to deterioration of the image quality.

The present invention has hence been made to provide an image pickup device and a signal processing method in which, even when black levels of a HOPB area, VOPB area, and an effective pixel area disagree with each other, the amounts of disagreements (or differences) are detected, by use of the VOPB area for column noise correction, and column noise is removed while correcting image signals from the effective pixel area.

According to the present invention, an image pickup device includes: a solid-state image pickup element having a pixel part including pixels uniformly arrayed in a matrix of lines and columns, the pixel part including an effective pixel area to be irradiated with light, and a vertical light-shielded pixel area and a horizontal light-shielded pixel area where irradiation of light is shielded, a vertical scanning circuit which controls control electrodes of pixels arranged in identical one of the lines and connected in common by a vertical selection line, a horizontal scanning circuit which controls control electrodes of vertical signal lines connected in common to main electrodes of pixels arranged in identical one of columns, to output sequentially pixel signals in units of lines to horizontal signal lines, the pixel signals being outputted through the vertical signal lines, and an output circuit which outputs pixel signals from the horizontal signal lines; a light-shielding means for shutting off light irradiated on the effective pixel area; a black level value detector means for detecting black level values of the vertical light-shielded pixel area, the horizontal light-shielded pixel area, and the effective pixel area shielded from light by the light-shielding means, based on pixel signals outputted from the output circuit of the solid state image pickup element; a comparator means for comparing the black level values of the respective areas, which are detected by the black level value detector means; a noise component detector means for detecting a noise component contained in pixel signals outputted from pixels arranged in the vertical light-shielded pixel area; a noise corrector means for correcting noise contained in pixel signals outputted from pixels arranged in the effective pixel area, based on the noise component detected by the noise component detector means; and a controller means for controlling the noise component detector means and the noise corrector means, based on a comparison result of the comparator means.

According to the present invention, a signal processing method for an image pickup device having a solid-state image pickup element having a pixel part including pixels uniformly arrayed in a matrix of lines and columns, the pixel part including an effective pixel area to be irradiated with light, and a vertical light-shielded pixel area and a horizontal light-shielded pixel area where irradiation of light is shielded, a vertical scanning circuit which controls control electrodes of pixels arranged in identical one of the lines and connected in common by a vertical selection line, a horizontal scanning circuit which controls control electrodes of vertical signal lines connected in common to main electrodes of pixels arranged in identical one of columns, to output sequentially pixel signals in units of lines to horizontal signal lines, the pixel signals being outputted through the vertical signal lines, and an output circuit which outputs pixel signals from the horizontal signal lines, the method including: a light-shielding step of shutting off light irradiated on the effective pixel area; a black level value detection step of detecting black level values of the vertical light-shielded pixel area, the horizontal light-shielded pixel area, and the effective pixel area shielded from light in the light-shielding step, based on pixel signals outputted from the output circuit of the solid state image pickup element; a comparison step of comparing the black level values of the respective areas, which are detected in the black level value detection step; a noise component detection step of detecting a noise component contained in pixel signals outputted from pixels arranged in the vertical light-shielded pixel area; a noise correction step of correcting noise contained in pixel signals outputted from pixels arranged in the effective pixel area, based on the noise component detected in the noise component detection step; and a control step of controlling the noise component detection step and the noise correction step, based on a comparison result of the comparison step.

In the present invention, black level values of the light-shielded effective pixel area A, VOPB area B, and HOPB area C of the solid-state image pickup element are detected respectively. A column noise corrector is controlled, according to four patterns: when the black level values of the VOPB area B and effective pixel area A are equal to each other: when the black level value of the VOPB area B is closer to the black level value of the effective pixel area A than the black level value of the HOPB area C but differs more or less; when the black level values of the HOPB area C and effective pixel area A are equal to each other; and when the black level value of the HOPB area C is closer to the black level value of the effective pixel area A than the black level value of VOPB area B but differs more or less. Therefore, the black level value of the effective pixel area A can be adjusted accurately (to zero) while correcting column noise contained in pixel signals of the effective pixel area A.

DETAILED DESCRIPTION OF THE PREFERRED EMBODIMENTS

Hereinafter, a description will be made of an image pickup device which picks up an image of an object and a signal processing method according to an embodiment of the present invention.

Figure 1:
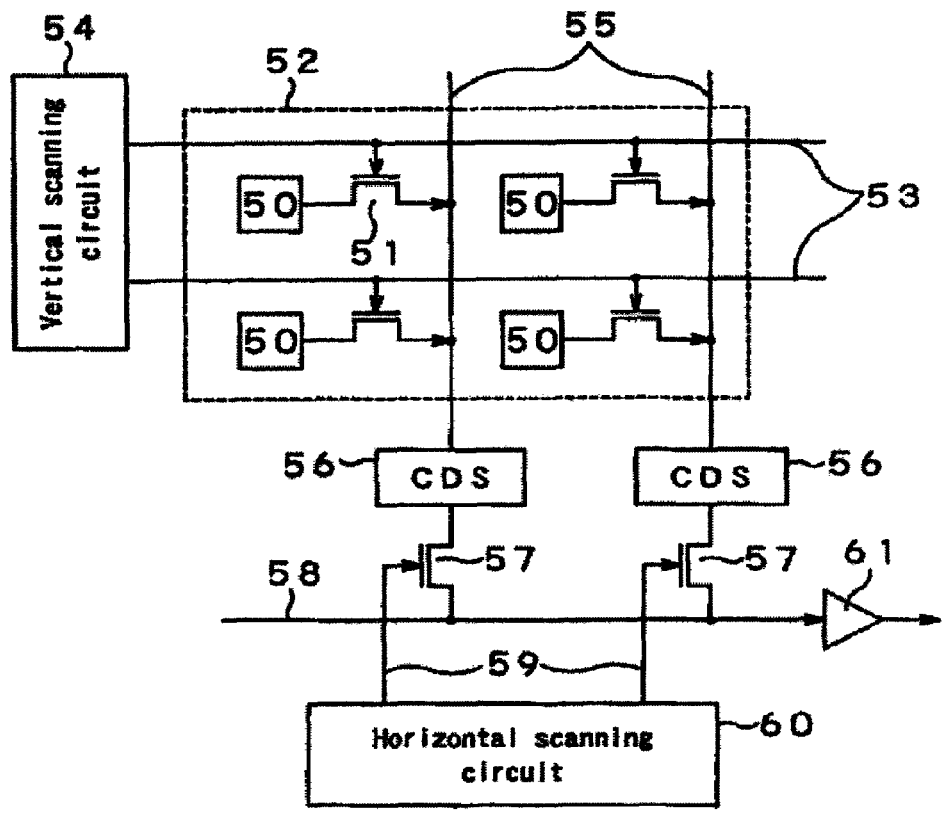
FIG. 1 is a schematic view showing the structure of a solid-state image pickup element.
Figure 2:
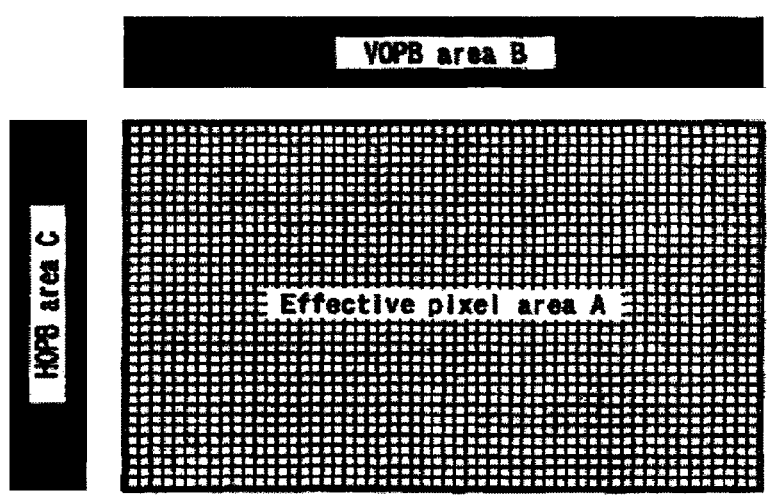
FIG. 2 is a view showing a state where a pixel part of the solid-state image pickup element is constructed by dividing the pixel part into an effective pixel area, a VOPB area, and HOPB area.
Figure 3A:
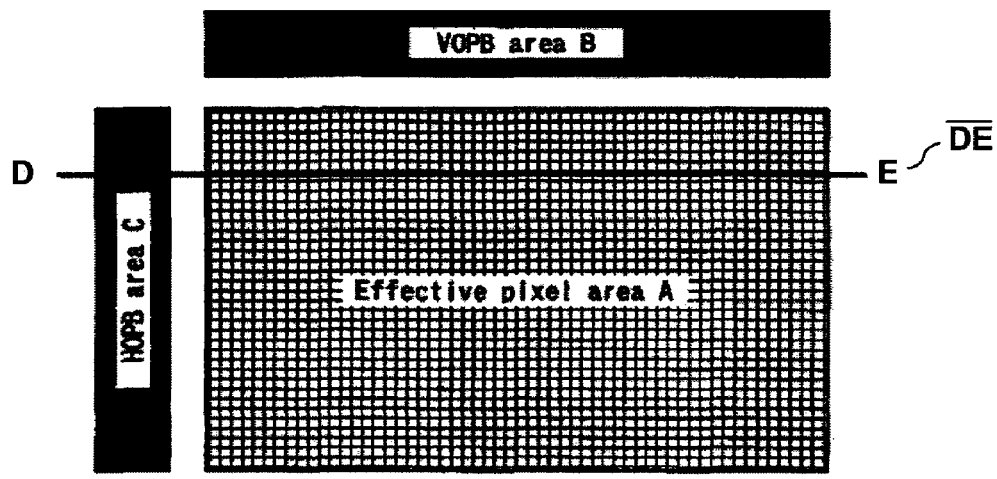
FIGS. 3A and 3B show a black level value difference A BL between the effective pixel area and the HOPB area in one predetermined line.
Figure 3B:
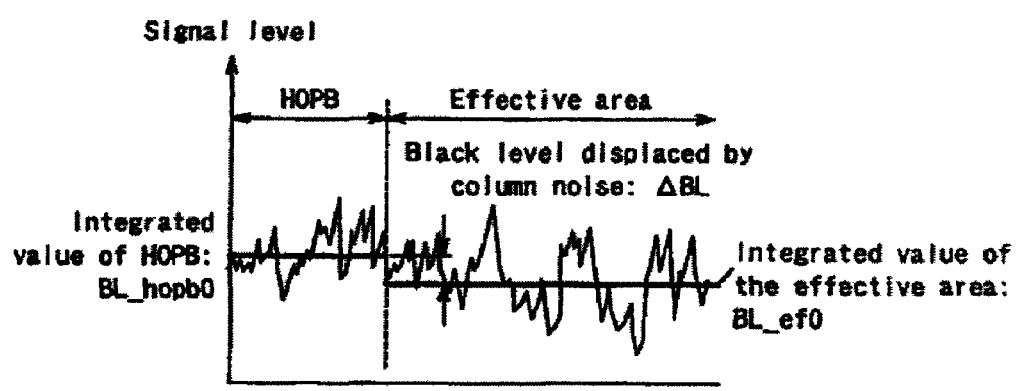
Figure 4:
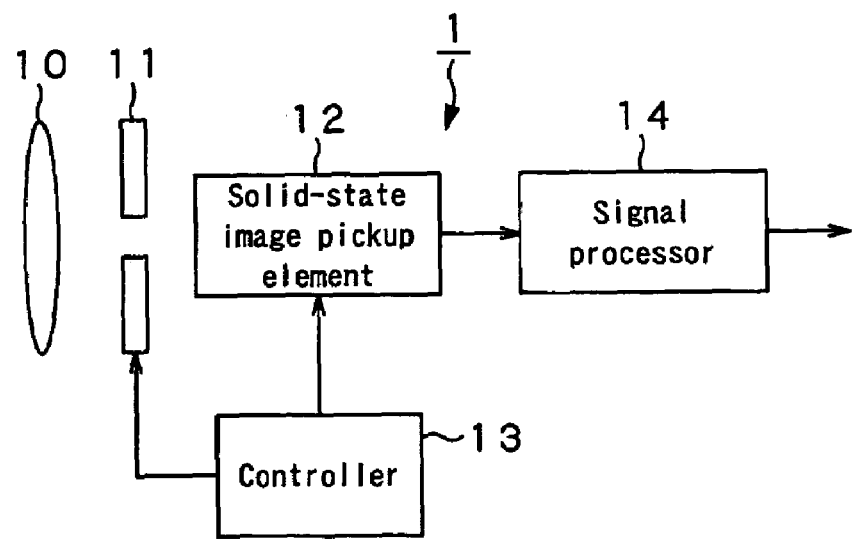
FIG. 4 is a block diagram showing the structure of the image pickup device according to the present invention.

As shown in FIG. 4, an image pickup device 1 has: a lens 10 which converges incident light; a shutter 11 which allows light converged by the lens 10 to pass for a predetermined time; a solid-state image pickup element 12 which picks up an image of an object which enters as light through the lens 10 and the shutter 11; a controller 13 which controls the shutter 11 and the solid-state image pickup element 12; and a signal processor 14 which performs a predetermined signal processing on a pixel signal picked up by the solid-state image pickup element 12.

Figure 5:
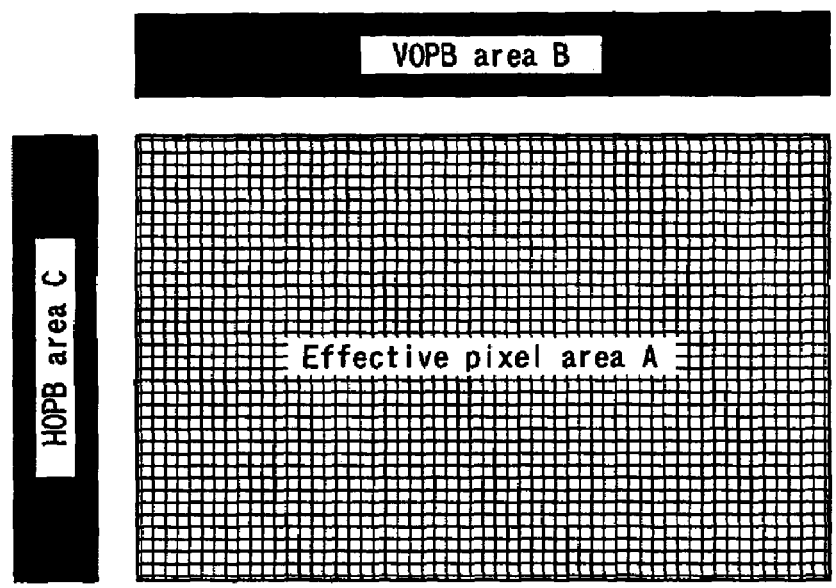
FIG. 5 is a view showing a state where the pixel part of the solid-state image pickup element is constructed by dividing the pixel part into an effective pixel area, a VOPB area and HOPB area.

Light emitted from the object enters into the solid-state image pickup element 12 through an optical system including the lens 10 and the shutter 11. The solid-state image pickup element 12 has a pixel part which picks up an image of the object. As shown in FIG. 5, the pixel part is constituted by an effective pixel area A irradiated with light, a vertical optical black (hereinafter called VOPB) area B where irradiation of light is shielded over several lines to several ten lines by a light-shield plate such as an aluminum thin film or the like, and a horizontal optical black (hereinafter called HOPB) area C where irradiation of light is shielded over several columns to several ten columns by a light-shield plate such as an aluminum thin film or the like.

The controller 13 controls opening/closing of the shutter 11. Also, the controller 13 has a mechanical shutter mode in which the shutter 11 which shields the light irradiated on the effective pixel area A is closed. The controller 13 controls the solid-state image pickup element 12, to make a signal processor 14 output a pixel signal S1 selectively outputted from pixels arranged in the effective pixel area A, VOPB area B, and HOPB area C.

Figure 6:
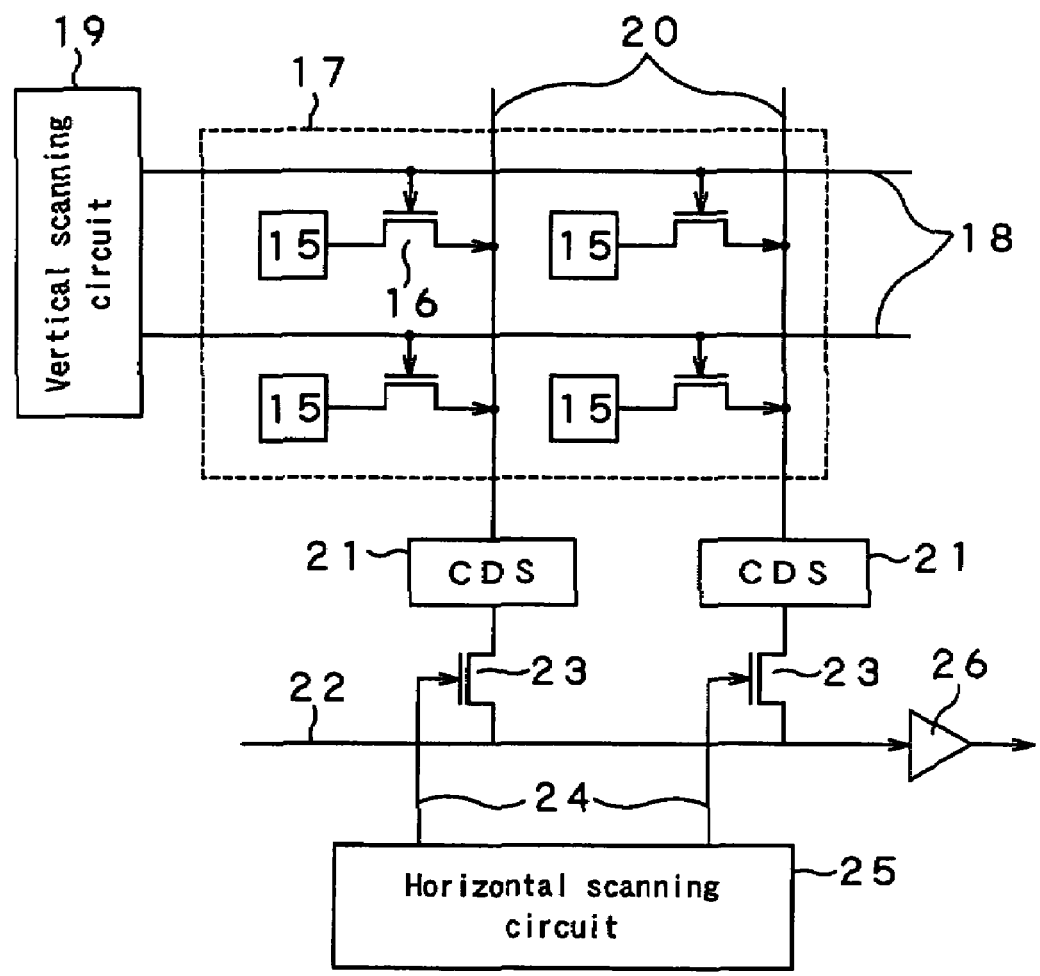
FIG. 6 is a schematic view showing the structure of the solid-state image pickup element.

The solid-state image pickup element 12 will now be described with reference to FIG. 6. The solid-state image pickup element 12 has: photosensitive parts 15 of, for example, an XY address type which store electric charges in accordance with irradiation of light, as shown in FIG. 6; a pixel part 17 constituted by pixel transistors 16 which output electric charges stored in the photosensitive part 15 and are arranged in a matrix of lines and columns; a vertical scanning circuit 19 which applies a pulse signal to vertical selection lines 18 each connecting pixels arranged in every one of lines of the matrix of the pixel part 17; correlative double sampling circuits (CDSs) 21 which remove offset signals from signals fed to vertical signal lines 20 by applying a pulse signal from the vertical scanning circuit 19, the vertical signal lines 20 each connecting pixels arranged in one of columns of the matrix of the pixel part 17; transistors 23 for feeding, to horizontal signal lines 22, signal from which offset signals have been removed by the CDSs 21; a horizontal scanning circuit 25 which supplies the transistors 23 with a pulse signal through horizontal selection lines 24, to feed the signals from which offset signals have been removed by the CDSs 21, to the horizontal signal lines 22; and an output circuit 26 which supplies the signal processor 14 with the signals fed to the horizontal scanning circuit 25.

In the solid-state image pickup element 12 of the XY-address type, the vertical signal lines 20 are different from each other between columns of pixels arrayed. Therefore, the pixel signal outputted from the output circuit 26 is influenced by offsets which vary between the columns if there is a characteristic variant between the CDSs 21 or the transistors 23. The offset for every column appears as stripe-like fixed pattern noise (hereinafter called column noise) on the display screen. This is a factor which causes deterioration in image quality. The signal processor 14 in the rear stage of the solid-state image pickup element 12 removes column noise of this kind.

Figure 7:
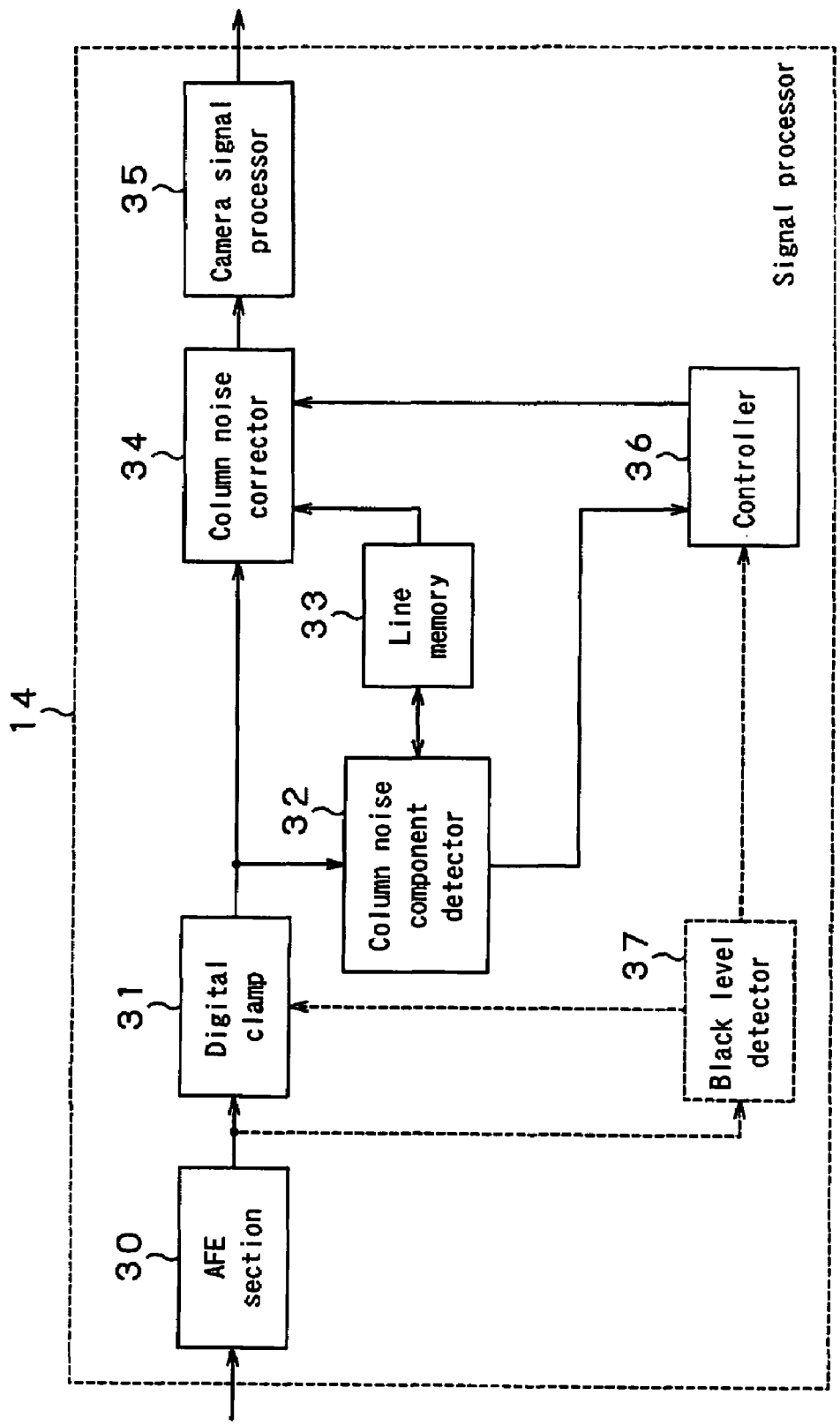
FIG. 7 is a block diagram showing the structure of a signal processor.

Next, the structure of the signal processor 14 will be described below. As shown in FIG. 7, the signal processor 14 has: an AFE (analog front end) section 30 which converts an output signal of the solid-state image pickup element 12 into a digital signal; a digital clamp 31 which performs a subtraction processing on a black level value of the HOPB area C from pixel signals supplied from the AFE section 30; a column noise component detector 32 which detects fixed-pattern noise (hereinafter called a column noise component) from pixel signals outputted from the digital clamp 31 and corresponding to the VOPB area B, and detects black level values of the effective pixel area A and VOPB area B; a line memory 33 which stores column noise components detected by the column noise component detector 32; a column noise corrector 34 which corrects column noise components of the pixel signals of the effective pixel area A supplied from the AFE section 30, based on a column noise component stored in the line memory 33; a camera signal processor 35 which performs a predetermined camera processing on an output signal from the column noise corrector 34; and a controller 36 which generates a predetermined control signal, based on the black level values of the effective pixel area A and VOPB area B detected by the column noise component detector 32, and supplies the column noise corrector 34 with the predetermined control signal.

The AFE section 30 converts pixel signals supplied from the solid-state image pickup element 12 into digital signals, and outputs the converted pixel signals.

The digital clamp 31 detects the black level value of the HOPB area C from pixel signals supplied from the AFE section 30, and subtracts the black level value of the HOPB area C from the pixel signals from the effective pixel area A and VOPB area B. The digital clamp 31 supplies the column noise component detector 32 with a signal obtained by subtracting the black level value of the HOPB area C from pixel signals from the VOPB area B, and a signal obtained by subtracting the black level value of the HOPB area C from pixel signal from the effective pixel area A. On the other side, the digital clamp 31 supplies the column noise corrector 34 with a signal obtained by subtracting the black level value of the HOPB area C from pixel signals from the effective pixel area A.

Taken into consideration that every pixel in one identical column has an equal amount of column noise, the column noise component detector 32 detects a column noise component from signals supplied to the digital clamp 31, and stores the detection result into the line memory 33. Also, the column noise component detector 32 detects black level values of the effective pixel area A and the VOPB area B, and outputs, to the controller 36, a difference value between the black level values of the VOPB area B and HOPB area C and a difference value between the effective pixel area A and HOPB area C.

A description will now be made of operation of detecting a difference value between the black level values of the HOPB area C and VOPB area B, by the column noise component detector 32. As described above, in the digital clamp 31, the black level value of the HOPB area C is subtracted from the pixel signals from the VOPB area B. Therefore, if there is no difference between the black level values of the HOPB area C and VOPB area B, the black level value of the VOPB area B is detected to be zero by the column noise component detector 32.

Otherwise, if there is a difference between the black level values of the HOPB area C and VOPB area B, the black level value of the VOPB area B is detected to be a positive or negative value by the column noise component detector 32. If the black level value of the VOPB area B is a positive value, it means that the black level value of the VOPB area B is higher than that of the HOPB area C. Alternatively, if the black level value of the VOPB area B is a negative value, it means that the black level value of the VOPB area B is lower than that of the HOPB area C.

Therefore, in order to detect the difference between the black level values of the HOPB area C and VOPB area B, it is necessary for the column noise component detector 32 to detect only the black level value of the VOPB area B because the black level value of the HOPB area C is zero. The method of detecting the black level value of the VOPB area B may be arranged so as to integrate the whole VOPB area B or to use a partial area of the VOPB area B for integration.

A next description will be made of operation of detecting a difference between the black level values of the effective pixel area A and VOPB area B, by the column noise component detector 32. Suppose that this detection operation is performed at the time of turning on the power of the image pickup device or at the time of factory shipment. To detect the black level value of the effective pixel area A, the shutter is closed to achieve light-shielding by setting the mechanical shutter mode.

As described above, in the digital clamp 31, the black level value of the HOPB area C is subtracted from the pixel signals from the effective pixel area A which is shielded from light by the mechanical shutter. Therefore, if there is no difference between the black level values of the effective pixel area A and HOPB area C, the black level value of the effective pixel area A is detected to be zero by the column noise component detector 32.

Otherwise, if there is a difference between the black level values of the effective pixel area A and HOPB area C, the black level value of the effective pixel area A is detected to be a positive or negative value by the column noise component detector 32. If the black level value of the effective pixel area A is a positive value, it means that the black level value of the effective pixel area A is higher than that of the HOPB area C. Alternatively, if the black level value of the effective pixel area A is a negative value, it means that the black level value of the effective pixel area A is lower than that of the HOPB area C.

Therefore, in order to detect the difference between the black level values of the HOPB area C and effective pixel area A, it is necessary for the column noise component detector 32 to detect only the black level value of the effective pixel area A because the black level value of the HOPB area C is zero. The method of detecting the black level value of the effective pixel area A may be arranged so as to integrate the whole effective pixel area A or to use a partial area of the effective pixel area A for integration.

The controller 36 generates a predetermined control signal, based on the difference value between the black level values of the VOPB area B and HOPB area C and the difference value between the black level values of the effective pixel area A and HOPB area C. The controller 36 supplies the column noise corrector 34 with the generated control signal.

The column noise corrector 34 corrects column noise of the pixel signals outputted from the pixels arranged in the effective pixel area A, based on the control signal generated by the controller 36 and the noise component detected by the column noise component detector 32. The column noise corrector 34 supplies the corrected signals to the camera signal processor 35. The camera signal processor 35 performs a predetermined camera signal processing on the signals whose column noise has been subjected to the correction processing by the column noise corrector 34.

Figure 8:
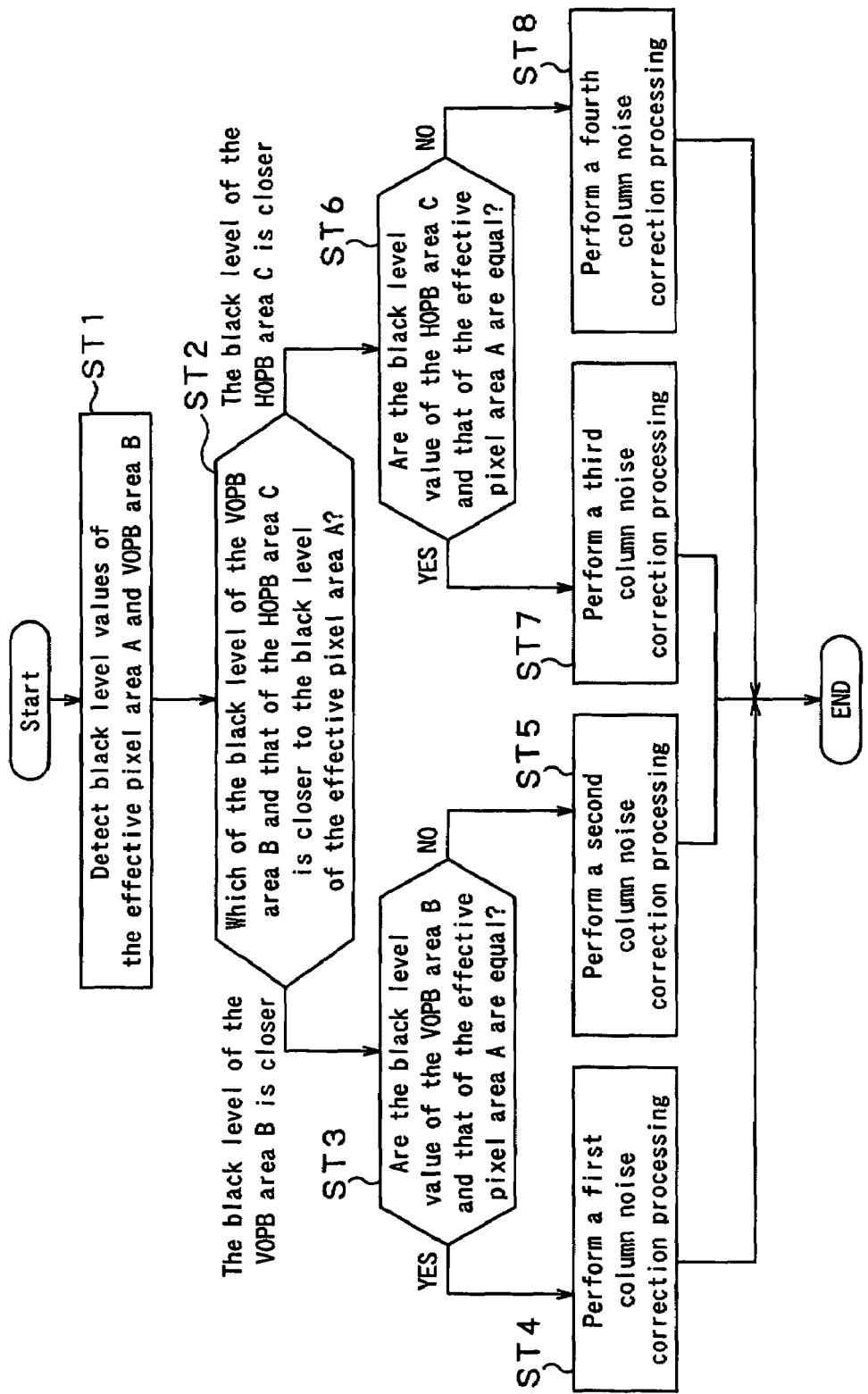
FIG. 8 is a flowchart used for explaining operation of the signal processor which adjusts the black level value of the effective pixel area to zero and performs column noise correction processing.

A description will now be made of operation of the signal processor in which the black level value of the effective pixel area A is adjusted to zero and correction of column noise is carried out, along the flowchart shown in FIG. 8.

In step ST1, the column noise component detector 32 detects black level values of the effective pixel area A and VOPB area B. The column noise component detector 32 detects a difference between the black level values of the effective pixel area A and HOPB area C and a difference between the black level values between the effective pixel area A and VOPB area B, based on the black level value of the effective pixel area A, the black level value of the VOPB area B, and the black level value of the HOPB area C detected by the digital clamp 31. The column noise component detector 32 supplies the controller 36 with the detected difference between the black level values of the effective pixel area A and HOPB area C and the detected difference between the effective pixel area A and VOPB area B.

In step ST2, the controller 36 determines which of the VOPB area B and HOPB area C has a black level closer to the black level of the effective pixel area A. Based on the difference between the black level values of the effective pixel area A and VOPB area B and the difference between the effective pixel area A and HOPB area C, the controller 36 compares the black levels of the VOPB area B and HOPB area C with the black level of the effective pixel area A, and determines which of the black levels of the VOPB area B and HOPB area C is closer to the black level of the effective pixel area A.

If the black level value of the effective pixel area A is closer to that of the VOPB area B, the processing goes to step ST3. Otherwise, if the black level value of the effective pixel area A is closer to that of the HOPB area C, the processing goes to step ST6.

In step ST3, the controller 36 determines whether or not the black level values of the VOPB area B and effective pixel area A are equal to each other. If the black level values of the VOPB area B and effective pixel area A are equal, the processing goes to step ST4. Otherwise, if the black level values of the VOPB area B and effective pixel area A are different from each other, the processing goes to step ST5.

In step ST4, the controller 36 does not control the column noise corrector 34.

A further description will be made below of operation of correcting column noise (a first column noise correction processing) when the black level values of the VOPB area B and effective pixel area A are equal to each other.

Figure 9:
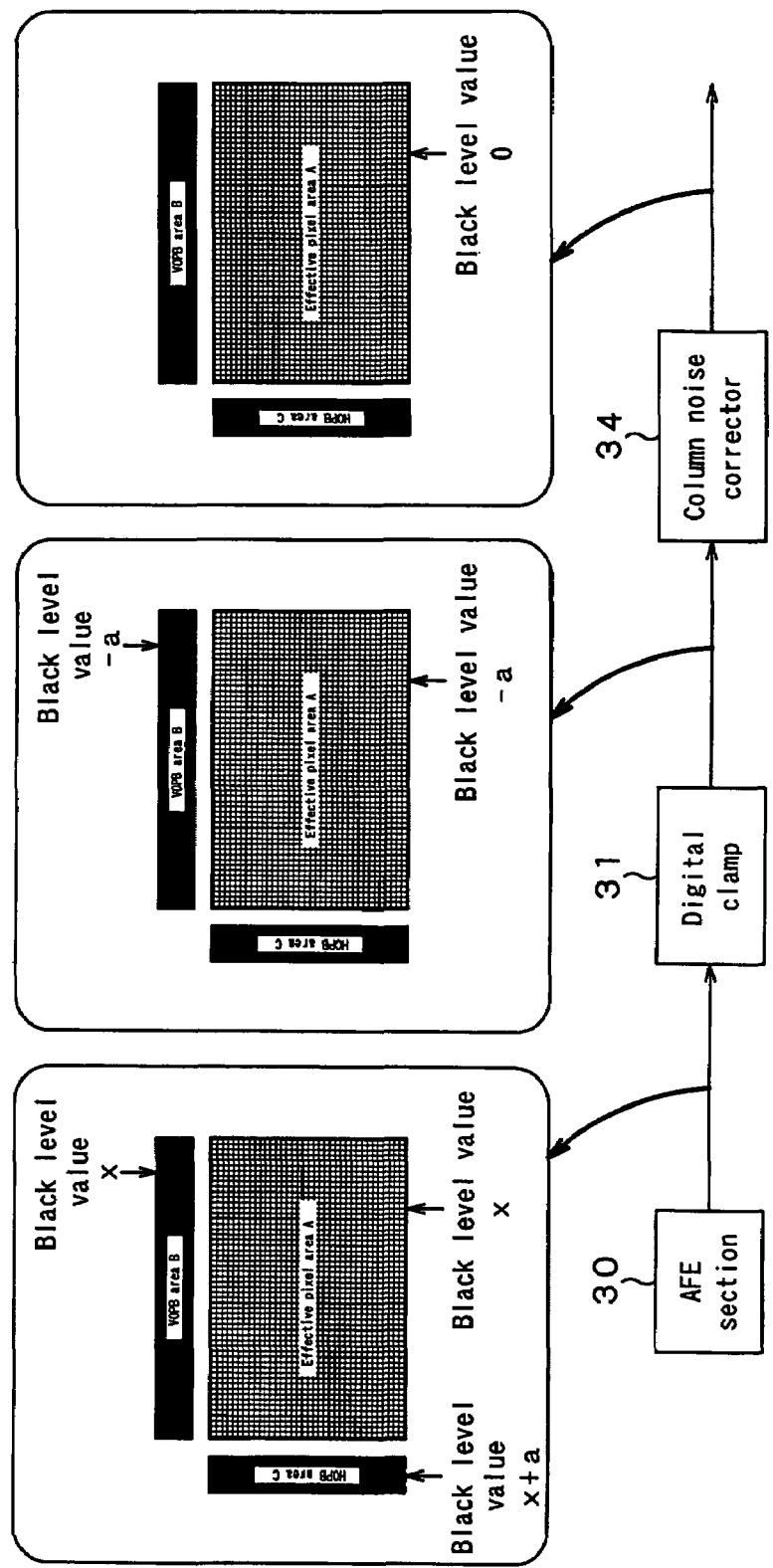
FIG. 9 is a view for explaining a first column noise correction processing.

Suppose, for example, a case that the black level value of the effective pixel area A is x, the black level value of the VOPB area B is also x, and the difference between the black level values of the HOPB area C and effective pixel area A is a, as shown in FIG. 9. In this case, the digital clamp 31 detects x+a as a black level value of pixel signals of the HOPB area C. The digital clamp 31 subtracts the black level value x+a of the HOPB area C from pixel signals from the VOPB area B, as well as the black level value x+a of the HOPB area C from pixel signals from the effective pixel area A.

Therefore, after passing through the digital clamp 31, both of the black level values of the VOPB area B and effective pixel area A are −a. Pixel signals from the effective pixel area A, which have a black level value of −a, are supplied to the column noise corrector 34. Pixel signals from the VOPB area B, which have a black level value of −a, are supplied to the column noise component detector 32.

The column noise component detector 32 detects a column noise component obtained by integrating the VOPB area B for every column, and stores the detected column noise component into the line memory 33. The black level value of the column noise component stored in the line memory 33 is −a.

Also, the column noise component detector 32 supplies the controller 36 with a difference value −a between the black level values of the VOPB area B and the HOPB area C, and a difference value −a between the black level values of the effective pixel area A and HOPB area C.

Based on signals supplied from the column noise component detector 32, the controller 36 determines that the black level values of the effective pixel area A and VOPB area B are equal to each other. If it is determined that the black level values of the effective pixel area A and VOPB area B are equal, the controller 36 does not control the column noise corrector 34.

Also, the column noise corrector 34 performs a processing of subtracting the column noise component stored in the line memory 33 from pixel signals from the effective pixel area A. Through this subtraction processing, the column noise corrector 34 performs correction of column noise contained in pixel signals from the effective pixel area A, and −a (offset component) of the black level value thereof is cancelled to become zero. Therefore, if the controller 36 does not control the column noise corrector 34 at all, the pixel signals of the effective pixel area A can be adjusted to the black level value of the VOPB area B.

In step ST5, the controller 36 performs predetermined control on the column noise corrector 34.

A further description will now be made of a column noise correction processing (a second column noise correction processing) when the black level of the VOPB area B is closer to that of the effective pixel area A than that of the HOPB area C but is more or less displaced.

Figure 10:
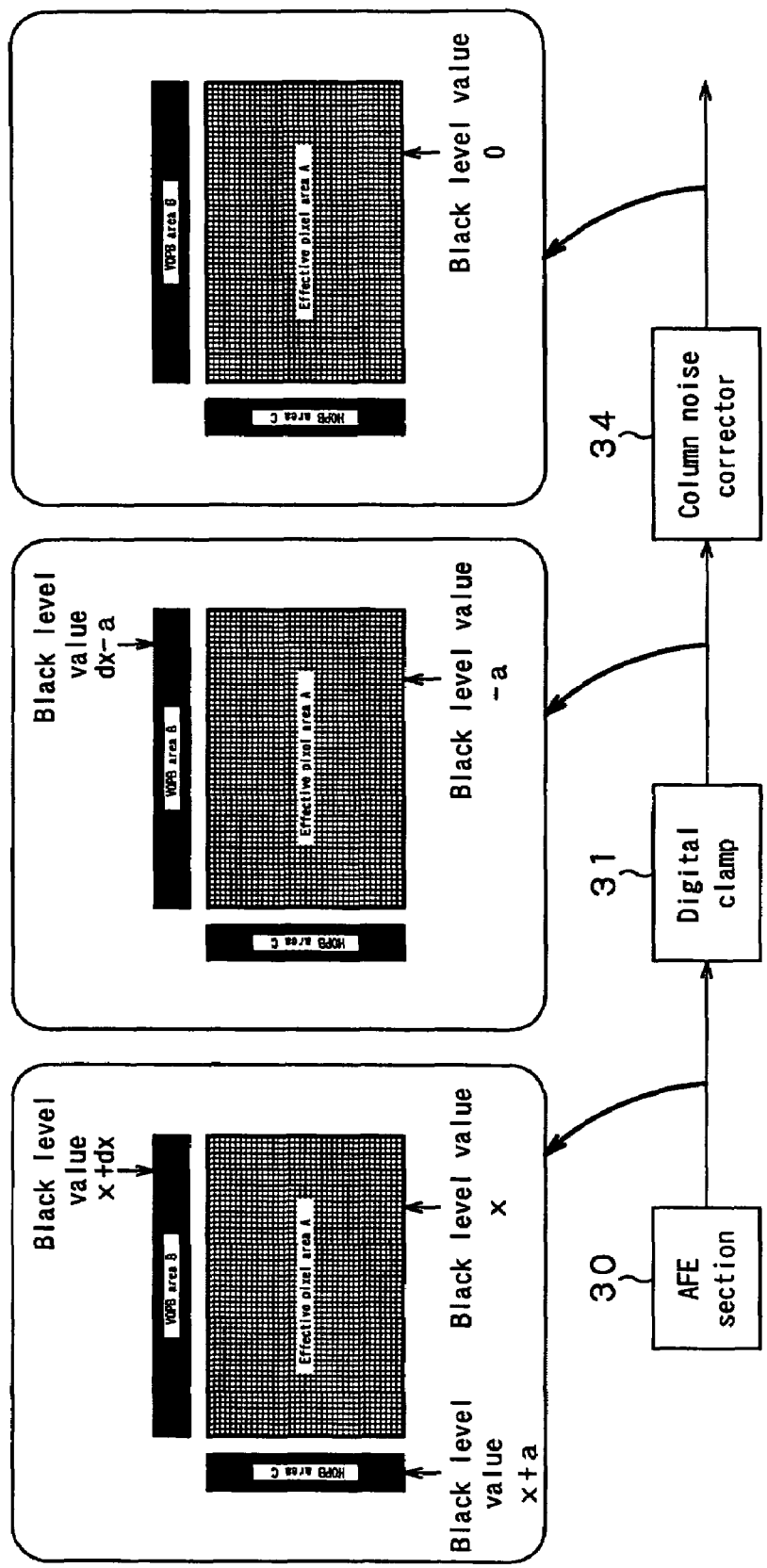
FIG. 10 is a view for explaining a second column noise correction processing.

Suppose, for example, a case that the black level value of the effective pixel area A is x, the black level value difference between the HOPB area C and effective pixel area A is a, and the black level value difference between the VOPB area B and effective pixel area A is dx (where dx<a), as shown in FIG. 10. In this case, the digital clamp 31 detects x+dx as the black level value of the VOPB area B as well as x+a as the black level value of the HOPB area C. The digital clamp 31 subtracts the black level value x+a of the HOPB area C from pixel signals from the VOPB area B, as well as the black level value x+a from the HOPB area C from pixel signals of the effective pixel area A.

Therefore, after passing through the digital clamp 31, the black level value of pixel signals from the effective pixel area A is −a, and the black level value of pixel signals from the VOPB area B is dx−a. Pixel signals from the effective pixel area A, which have the black level value of −a, are supplied to the column noise corrector 34. Pixel signals from the VOPB area B, which have the black level value of dx−a, are supplied to the column noise component detector 32.

The column noise component detector 32 detects a column noise component obtained by integrating the VOPB area B for every column, and stores the detected column noise component into the line memory 33. The black level value of the column noise component stored in the line memory 33 is dx−a.

Also, the column noise component detector 32 supplies the controller 36 with the difference value dx −a between the black level values of the VOPB area B and HOPB area C, and the difference value −a between the black level values of the effective pixel area A and HOPB area C.

Based on signals supplied from the column noise component detector 32, the controller 36 determines that the black level value of the VOPB area B is closer to the black level value of the effective pixel area A than the black level value of the HOPB area C but is displaced more or less. The controller 36 generates a predetermined control signal according to this determination, and supplies the column noise corrector 34 with the generated control signal.

In response to the control signal supplied from the controller 36, the column noise corrector 34 subtracts the black level value difference dx between the effective pixel area A and the VOPB area B, from the column noise component stored in the line memory 33. The column noise corrector 34 performs a processing of subtracting the subtraction result from pixel signals from the effective pixel area A. Through this subtraction processing, the column noise corrector 34 can correct column noise contained in pixel signals from the effective pixel area A, and the offset component of −a of the black level value can be cancelled to become zero.

In step ST6, the controller 36 determines whether or not the black level values of the HOPB area C and effective pixel area A are equal to each other. If the black level values of the HOPB area C and effective pixel area A are equal, the processing goes to step ST7. Otherwise, if the black level values of the HOPB area C and effective pixel area A are different from each other, the processing goes to step ST8.

In the step ST7, the controller 36 performs predetermined control on the column noise corrector 34.

A further description will be made below of a column noise correction processing (a third column noise correction processing) when the black level values of the HOPB area C and effective pixel area A are equal to each other.

Figure 11:
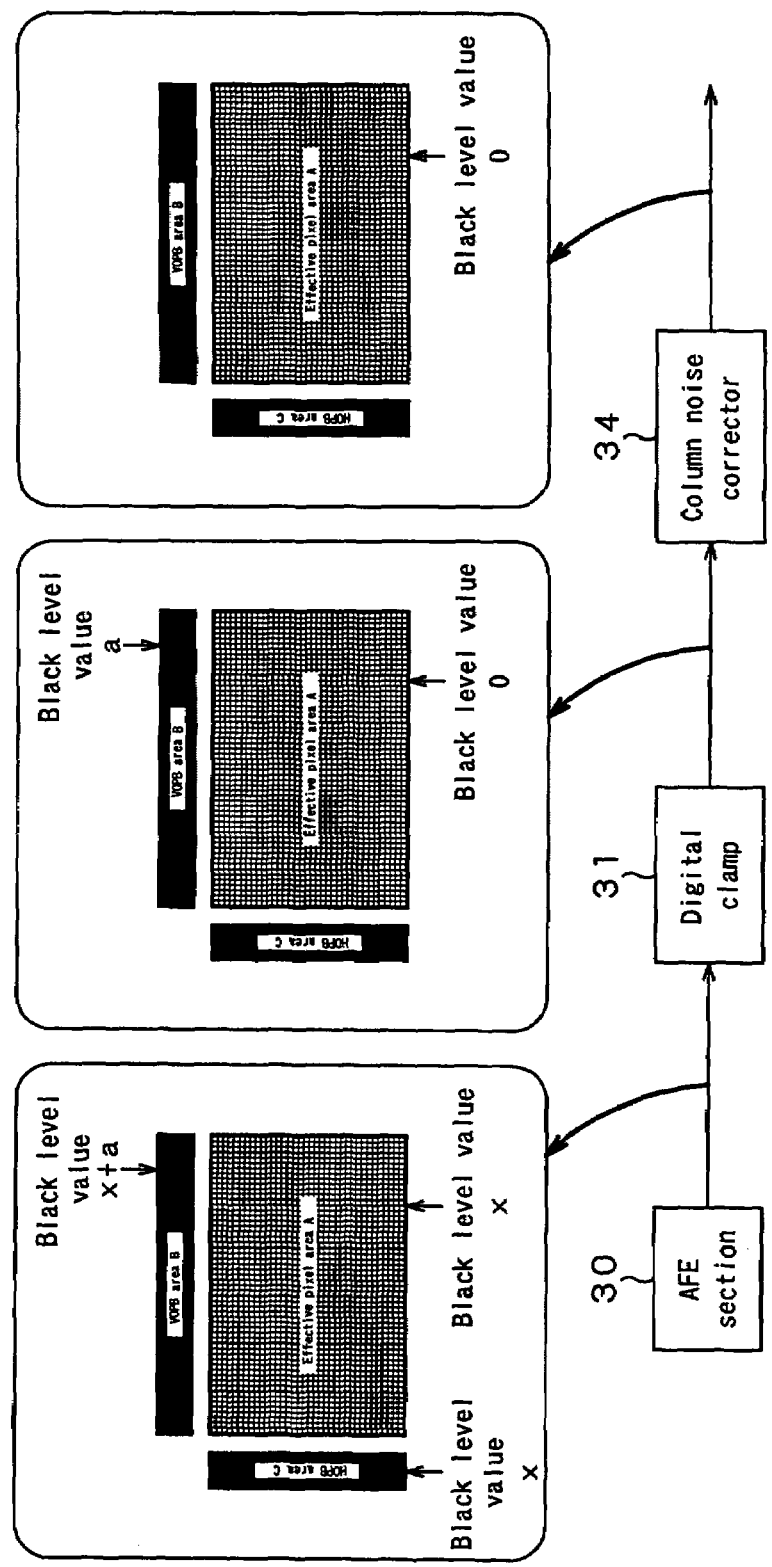
FIG. 11 is a view for explaining a third column noise correction processing.
Figure 12:
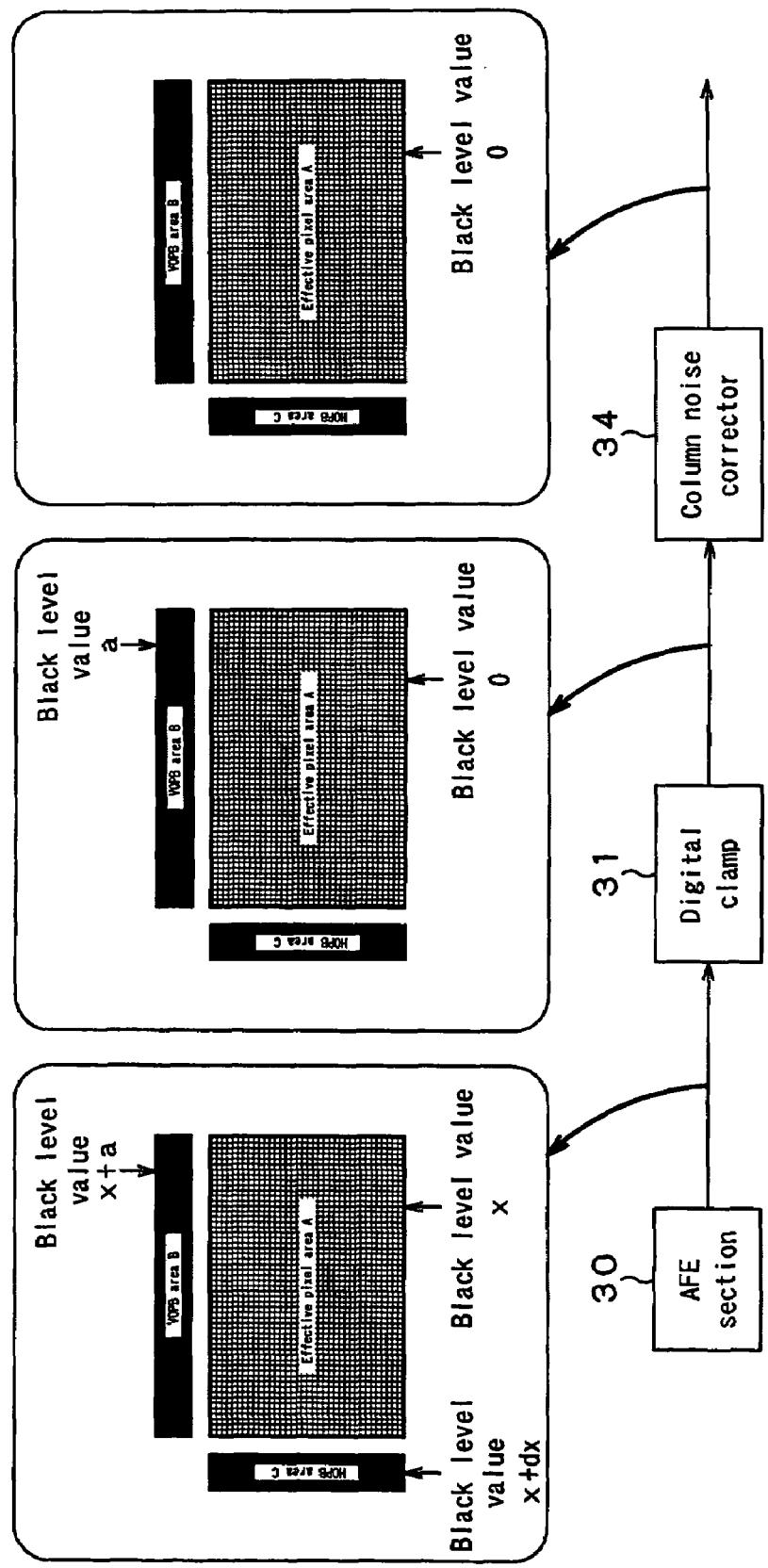
FIG. 12 is a view for explaining a fourth column noise correction processing.

Suppose, for example, a case that the black level value of the effective pixel area A is x, the black level value of the HOPB area C is x, and the black level value difference between the VOPB area B and effective pixel area A is a, as shown in FIG. 11. In this case, the digital clamp 31 detects x+a as the black level value of the VOPB area B. The digital clamp 31 subtracts the black level value x of the HOPB area C from pixel signals from the VOPB area B, as well as the black level value x of the HOPB area C from pixel signals from the effective pixel area A.

Therefore, after passing through the digital clamp 31, the black level value of the effective pixel area A is 0, and the black level value of the VOPB area B is a. Pixel signals of the effective pixel area A, which have the black level value of 0, are supplied to the column noise corrector 34. Pixel signals from the VOPB area B, which have the black level value of a, are supplied to the column noise component detector 32.

The column noise component detector 32 detects a column noise component obtained by integrating the VOPB area B for every column, and stores the detected column noise component into the line memory 33. The black level value of the column noise component stored in the line memory 33 is a.

Also, the column noise component detector 32 supplies the controller 36 with the difference value a between the VOPB area B and HOPB area C, and the difference value 0 between the effective pixel area A and HOPB area C.

Based on signals supplied from the column noise component detector 32, the controller 36 determines that the black level values of the effective pixel area A and HOPB area C are equal to each other. The controller 36 generates a predetermined control signal, according to this determination, and supplies the column noise corrector 34 with the generated control signal.

In response to the control signal supplied from the controller 36, the column noise corrector 34 subtracts the black level value a (offset component) of the VOPB area B from the column noise component stored in the line memory 33. The column noise corrector 34 performs a processing of subtracting the column noise component from which the black level value a of the VOPB area B has been subtracted, from pixel signals from the effective pixel area A. Through this subtraction processing, the column noise corrector 34 can correct column noise contained in pixel signals from the effective pixel area A, maintaining the black level value of the effective pixel area A at zero.

In step ST8, the controller 36 performs predetermined control on the column noise corrector 34.

A further description will be made below of a column noise correction processing (a fourth column noise correction processing) when the black level value of the HOPB area C is closer to the black level value of the effective pixel area A than the black level value of the VOPB area B.

Suppose, for example, a case that the black level value of the effective pixel area A is x, the black level value difference between the VOPB area B and effective pixel area A is a, and the black level value difference between the HOPB area C and effective pixel area A is dx (where dx<a). In this case, the digital clamp 31 detects and holds the black level value difference dx between the HOPB area C and effective pixel area A, with the mechanical shutter closed.

Although the digital clamp 31 constantly detects the black level value x+dx of the HOPB area C, the digital clamp 31 subtracts a value equivalent to x from signals from the VOPB area B and effective pixel area A, considering the black level value difference dx. Therefore, after passing through the digital clamp 31, the black level value of the effective pixel area A is 0, and the black level value of the VOPB area B is a. Pixel signals from the effective pixel area A, which have the black level value of 0, are supplied to the column noise corrector 34. Pixel signals from the VOPB area B, which have the black level value of a, are supplied to the column noise component detector 32.

The column noise component detector 32 detects a column noise component obtained by integrating the VOPB area B for every column, and stores the detected column noise component into the line memory 33. The black level value of the column noise component stored in the line memory 33 is a.

Also, the column noise component detector 32 supplies the controller 36 with the difference value a between the VOPB area B and HOPB area C, and the difference value 0 between the effective pixel area A and HOPB area C.

Based on signals supplied from the column noise component detector 32, the controller 36 determines that the black level value of HOPB area C is closer to the black level value of the effective pixel area A than the black level value of the VOPB area B but is displaced more or less. The controller 36 generates a predetermined control signal, according to this determination, and supplies the column noise corrector 34 with the generated control signal.

In response to the control signal supplied from the controller 36, the column noise corrector 34 subtracts the black level value a (offset component) of the VOPB area B from the column noise component stored in the line memory 33. The column noise corrector 34 performs a processing of subtracting the column noise component from which the black level value a of the VOPB area B has been subtracted, from pixel signals from the effective pixel area A. Through this subtraction processing, the column noise corrector 34 can correct column noise contained in pixel signals from the effective pixel area A, maintaining the black level value of the effective pixel area A at zero.

In the present embodiment, the column noise component detector 32 performs detection of black level values of the effective pixel area A, the VOPB area B and HOPB area C. However, the location where the black level value is detected in each area is not particularly limited. For example, it is possible to adopt a structure in which a black level value detector 37 for detecting the black level value is provided between the AFE section 30 and the digital clamp 31, as indicated by a broken line in FIG. 7.

In this case, the black level value detector 37 detects, from pixel signals supplied from the AFE section 30, black level values of the VOPB area B, HOPB area C, and effective pixel area A which is shield from light by the mechanical shutter. The black level value detector 37 supplies the digital clamp 31 with the black level value of the HOPB area C.

If the black level value detector 37 is provided as described above, the column noise component detector 32 does not detect the black level value of the effective pixel area A, VOPB area B, or HOPB area C.

The digital clamp 31 performs a processing of subtracting the black level value of the HOPB area C supplied from the black level value detector 37, from pixel signals from the effective pixel area A and VOPB area B supplied from the AFE section 30. The digital clamp 31 supplies the column noise corrector 34 with signals obtained by subtracting the black level value of the HOPB area C from pixel signals from the effective pixel area A. Also, the digital clamp 31 supplies the column noise component detector 32 with signals obtained by subtracting the black level value of the HOPB area C from pixel signals from the VOPB area B.

The controller 36 calculates differences between black level values of the respective areas supplied from the black level value detector 37, and generates control signals corresponding to the difference values. The controller 36 supplies the column noise corrector 34 with the generated control signals. Operations of the controller 36 and the column noise corrector 34 are similar to the steps ST4 and ST5 and the steps ST7 and ST8 described above.

Thus, the image pickup device 1 according to the present invention detects black level values of the effective pixel area A shielded from light by the mechanicals shutter of the solid-state image pickup element 12, VOPB area B, and HOPB area C. The column noise corrector 34 is controlled, according to four patterns: when the black level values of the VOPB area B and effective pixel area A are equal to each other: when the black level value of the VOPB area B is closer to the black level value of the effective pixel area A than the black level value of the HOPB area C but differs more or less; when the black level values of the HOPB area C and effective pixel area A are equal to each other; and when the black level value of the HOPB area C is closer to the black level value of the effective pixel area A than the black level value of VOPB area B but differs more or less. Therefore, the black level value of the effective pixel area A can be adjusted to zero while correcting column noise contained in pixel signals of the effective pixel area A.

Figure 13A:
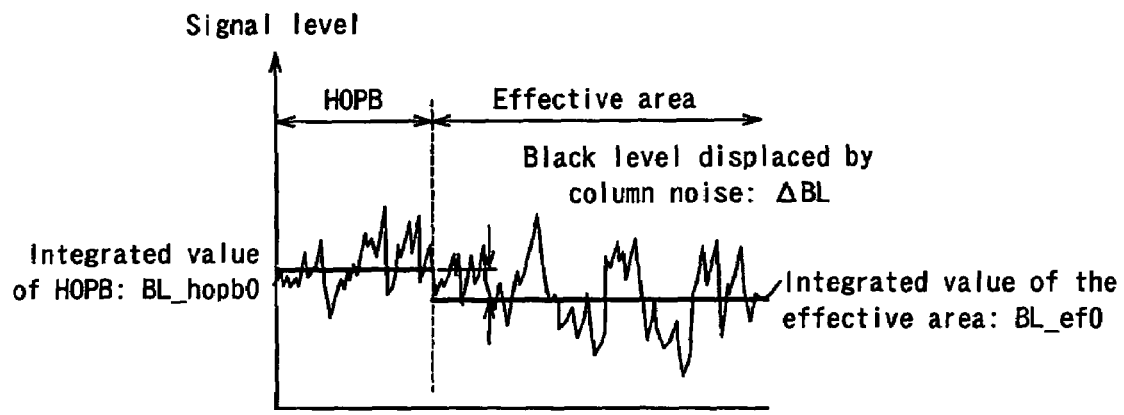
FIGS. 13A and 13B are graphs for explaining column noise correction in case where the black level value changes in accordance with a rise or drop of the internal temperature.
Figure 13B:
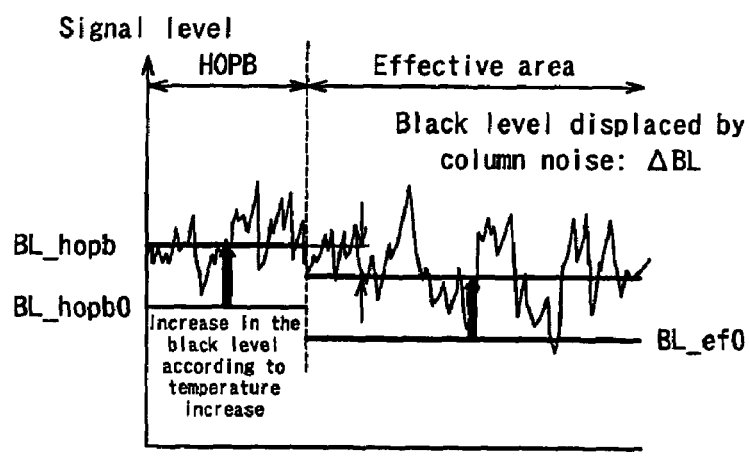

In the image pickup device 1, as shown in FIG. 13, the internal temperature inside the pixel part rises or drops as the device performs an operation of picking up an image of an object or the like. In accordance with the rise or drop, the black level values of pixel signals outputted from respective areas of the pixel part (e.g., the effective pixel area A, VOPB area B, and HOPB area C) rise or drop. However, the amount of the rise or drop of the internal temperature is identical to every one of the areas of the pixel part. Therefore, the image pickup device 1 according to the present invention may have a structure as follows. For example, when the power is turned on, the black level value BL_ef0 of the effective pixel area A and the black level value BL_hopb0 of the HOPB area C in the mechanical shutter mode are detected, and the black level value difference (ΔBL=BL_ef0−BL_hopb0) is obtained (wherein the black level value difference ΔBL does not change after this difference is once detected). When correcting column noise, predetermined correction is performed in accordance with the rise or drop of the internal temperature inside the pixel part.

By adopting this structure, the image pickup device 1 according to the present invention can adjust the black level value of the effective pixel area A to zero while performing correction of column noise contained in pixel signals from the effective pixel area A, even if a black level value changes due to a rise or drop of the internal temperature.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup device comprising:
    a solid-state image pickup element having
        a pixel part including pixels arrayed in a matrix of lines and columns, the pixel part including an effective pixel area to be irradiated with light, a vertical light-shielded pixel area where irradiation of light is shielded, and a horizontal light-shielded pixel area where irradiation of light is shielded,
        a vertical scanning circuit which controls control electrodes of pixels arranged a line and connected in common by a vertical selection line,
        a horizontal scanning circuit which controls control electrodes of vertical signal lines connected in common to main electrodes of pixels arranged in a column, and
        an output circuit which outputs pixel signals;
    a light-shielding section which shuts off light irradiated on the effective pixel area;
    a black level value detector which detects black level values of the vertical light-shielded pixel area, the horizontal light-shielded pixel area, and the effective pixel area, based on the pixel signals;
    a comparator which compares the black level values;
    a noise component detector which detects a noise component contained in pixel signals outputted from pixels arranged in the vertical light-shielded pixel area;
    a noise corrector which corrects noise contained in pixel signals outputted from pixels arranged in the effective pixel area, based on the noise component detected by the noise component detector;
    a controller which controls the noise component detector and the noise corrector, based on a comparison result of the comparator; and
    a black level value subtraction unit which subtracts the black level value of the horizontal light-shielded pixel area from pixel signals from the vertical light-shielded pixel area and subtracts the black level value of the horizontal light-shielded pixel area from pixel signals from the effective pixel area, wherein
    the noise component detector detects a noise component contained in the pixel signals from the vertical light-shielded pixel area, which have been processed by the black level value subtraction unit, and
    the noise corrector corrects noise contained in the pixel signals from the effective pixel area, which have been processed by the black level value subtraction unit.

2. The image pickup device according to claim 1, wherein the black level value detector detects each of black level values of pixel signals outputted from pixels arranged in a vertical optical black area as the vertical light-shielded pixel area, a horizontal optical black area as the horizontal light-shielded pixel area, and the effective pixel area shielded from light by the light-shielding means.

3. The image pickup device according to claim 1, wherein the light-shielding means shuts off light which is let enter into the effective pixel area by a mechanical shutter.

4. An image pickup device comprising:
    a solid-state image pickup element having
        a pixel part including pixels arrayed in a matrix of lines and columns, the pixel part including an effective pixel area to be irradiated with light, a vertical light-shielded pixel area where irradiation of light is shielded, and a horizontal light-shielded pixel area where irradiation of light is shielded,
        a vertical scanning circuit which controls control electrodes of pixels arranged in a line and connected in common by a vertical selection line,
        a horizontal scanning circuit which controls control electrodes of vertical signal lines connected in common to main electrodes of pixels arranged in a column, and
        an output circuit which outputs pixel signals;
    a light-shielding section which shuts off light irradiated on the effective pixel area;
    a black level value detector which detects black level values of the vertical light-shielded pixel area, the horizontal light-shielded pixel area, and the effective pixel area, based on the pixel signals;
    a comparator which compares the black level values;
    a noise component detector which detects a noise component contained in pixel signals outputted from pixels arranged in the vertical light-shielded pixel area;
    a noise corrector which corrects noise contained in pixel signals outputted from pixels arranged in the effective pixel area, based on the noise component detected by the noise component detector; and
    a controller which controls the noise component detector and the noise corrector, based on a comparison result of the comparator,
    wherein if the black level values of the horizontal light-shielded pixel area and the effective pixel area are equal to each other, the controller performs a process of subtracting an offset amount of the black level value of the vertical light-shielded pixel area from the noise component and controls the noise corrector such that noise is corrected based on a noise component obtained by the subtraction processing.

5. An image pickup device comprising:
    a solid-state image pickup element having
        a pixel part including pixels arrayed in a matrix of lines and columns, the pixel part including an effective pixel area to be irradiated with light, a vertical light-shielded pixel area where irradiation of light is shielded, and a horizontal light-shielded pixel area where irradiation of light is shielded,
        a vertical scanning circuit which controls control electrodes of pixels arranged in a line and connected in common by a vertical selection line, a horizontal scanning circuit which controls control electrodes of vertical signal lines connected in common to main electrodes of pixels arranged in a column, and an output circuit which outputs pixel signals;

a light-shielding section which shuts off light irradiated on the effective pixel area;

a black level value detector which detects black level values of the vertical light-shielded pixel area, the horizontal light-shielded pixel area, and the effective pixel area, based on the pixel signals;

a comparator which compares the black level values;

a noise component detector which detects a noise component contained in pixel signals outputted from pixels arranged in the vertical light-shielded pixel area;

a noise corrector which corrects noise contained in pixel signals outputted from pixels arranged in the effective pixel area, based on the noise component detected by the noise component detector;

a controller which controls the noise component detector and the noise corrector, based on a comparison result of the comparator; and a black level subtraction unit, wherein if the black level value of the horizontal light-shielded pixel area is approximate to the black level value of the effective pixel area, the controller controls the black level value subtraction unit to subtract the black level value of the horizontal light-shielded pixel area from pixel signals from the vertical light-shielded pixel area, by an amount considering a difference between the black level value of the horizontal light-shielded pixel area and the black level value of the effective pixel area, and to subtract the black level value of the horizontal light-shielded pixel area from pixel signals from the effective pixel area, by an amount considering a difference between the black level value of the horizontal light-shielded pixel area and the black level value of the effective pixel area, and controls the noise corrector to perform a processing of subtracting an offset amount of the black level value of the vertical light-shielded pixel area from the noise component detected by the noise component detector and to correct noise based on the noise component obtained by the subtraction processing.

6. An image pickup device comprising:

a solid-state image pickup element having a pixel part including pixels arrayed in a matrix of lines and columns, the pixel part including an effective pixel area to be irradiated with light, a vertical light-shielded pixel area where irradiation of light is shielded, and a horizontal light-shielded pixel area where irradiation of light is shielded, a vertical scanning circuit which controls control electrodes of pixels arranged in a line and connected in common by a vertical selection line, a horizontal scanning circuit which controls control electrodes of vertical signal lines connected in common to main electrodes of pixels arranged in a column, and an output circuit which outputs pixel signals;

a light-shielding section which shuts off light irradiated on the effective pixel area;

a black level value detector which detects black level values of the vertical light-shielded pixel area, the horizontal light-shielded pixel area, and the effective pixel area, based on the pixel signals;

a comparator which compares the black level values;

a noise component detector which detects a noise component contained in the pixel signals;

a noise corrector which corrects noise contained in pixel signals outputted from pixels arranged in the effective pixel area, based on the noise component detected by the noise component detector; and a controller which controls the noise component detector and the noise corrector, based on a comparison result of the comparator;

wherein if the black level value of the vertical light-shielded pixel area is approximate to the black level value of the effective pixel area, the controller means controls the noise corrector to perform a process of subtracting a difference between the black level value of the vertical light-shielded pixel area and the black level value of the effective pixel area from the noise component detected by the noise component detector, and to correct noise based on the noise component obtained by the subtraction processing.

7. A signal processing method for an image pickup device comprising pixels arrayed in a matrix of lines and columns, the pixels including an effective pixel area, a vertical light-shielded pixel area, and a horizontal light-shielded pixel area, the method comprising:

shielding the effective pixel area from light;

detecting black level values of the vertical light-shielded pixel area, the horizontal light-shielded pixel area, and the effective pixel area shielded from light;

comparing the black level values of the respective areas to produce a comparison result;

detecting a noise component in pixel signals from the vertical light-shielded pixel area;

correcting noise contained in pixel signals from pixels the effective pixel area, based on the noise component;

subtracting the black level value of the horizontal light-shielded pixel area from pixel signals from the vertical light-shielded pixel area; and subtracting the black level value of the horizontal light-shielded pixel area from pixel signals from the effective pixel area, wherein detecting a noise component includes detecting a noise component contained in the pixel signals from the vertical light-shielded pixel area, which have been subjected to a subtraction step, and wherein correcting noise includes correcting noise contained in the pixel signals from the effective pixel area, which have been subjected to a subtraction step.

8. The signal processing method according to claim 7, wherein each of black level values of pixel signals outputted from pixels arranged in a vertical optical black area as the vertical light-shielded pixel area, a horizontal optical black area as the horizontal light-shielded pixel area, and the effective pixel area shielded from light by the light-shielding means is detected.

9. The signal processing method according to claim 7, wherein in a mechanical shutter is used shut off light irradiated on the effective pixel area.

10. A signal processing method for an image pickup device comprising pixels arrayed in a matrix of lines and columns, the pixels including an effective pixel area, a vertical light-shielded pixel area, and a horizontal light-shielded pixel area, the method comprising:

shielding the effective pixel area from light;

detecting black level values of the vertical light-shielded pixel area, the horizontal light-shielded pixel area, and the effective pixel area shielded from light;

comparing the black level values of the respective areas to produce a comparison result;

detecting a noise component in pixel signals from the vertical light-shielded pixel area;

correcting noise contained in pixel signals from pixels the effective pixel area, based on the noise component;

subtracting an offset amount of the black level value of the vertical light-shielded pixel area from the noise component and correcting the noise based on a noise component obtained by the subtraction processing, if the black level values of the horizontal light-shielded pixel area and the effective pixel area are equal to each other.

11. A signal processing method for an image pickup device comprising pixels arrayed in a matrix of lines and columns, the pixels including an effective pixel area, a vertical light-shielded pixel area, and a horizontal light-shielded pixel area, the method comprising:

shielding the effective pixel area from light;

detecting black level values of the vertical light-shielded pixel area, the horizontal light-shielded pixel area, and the effective pixel area shielded from light;

comparing the black level values of the respective areas to produce a comparison result;

detecting a noise component in pixel signals from the vertical light-shielded pixel area;

correcting noise contained in pixel signals from pixels the effective pixel area, based on the noise component; and performing subtraction processing, if the black level value of the horizontal light-shielded pixel area is approximate to the black level value of the effective pixel area, wherein the subtraction processing includes subtracting the black level value of the horizontal light-shielded pixel area from pixel signals from the vertical light-shielded pixel area, by an amount considering a difference between the black level value of the horizontal light-shielded pixel area and the black level value of the effective pixel area, subtracting the black level value of the horizontal light-shielded pixel area from pixel signals from the effective pixel area, by an amount considering a difference between the black level value of the horizontal light-shielded pixel area and the black level value of the effective pixel area, and subtracting an offset amount of the black level value of the vertical light-shielded pixel area from the noise component, and wherein the correcting noise step includes correcting noise based on the noise component obtained by the subtraction processing, if the black level value of the horizontal light-shielded pixel area is approximate to the black level value of the effective pixel area.

12. A signal processing method for an image pickup device comprising pixels arrayed in a matrix of lines and columns, the pixels including an effective pixel area, a vertical light-shielded pixel area, and a horizontal light-shielded pixel area, the method comprising:

shielding the effective pixel area from light;

detecting black level values of the vertical light-shielded pixel area, the horizontal light-shielded pixel area, and the effective pixel area shielded from light;

comparing the black level values of the respective areas to produce a comparison result;

detecting a noise component in pixel signals from the vertical light-shielded pixel area;

correcting noise contained in pixel signals from pixels the effective pixel area, based on the noise component; and performing subtraction processing, if the black level value of the vertical light-shielded pixel area is approximate to the black level value of the effective pixel area, wherein subtraction processing includes subtracting a difference between the black level value of the vertical light-shielded pixel area and the black level value of the effective pixel area from the noise component detected in the noise component detector step is performed, and wherein the correcting noise step includes correcting noise based on the noise component obtained by the subtraction processing, if the black level value of the horizontal light-shielded pixel area is approximate to the black level value of the effective pixel area.

* * * * *